(12) United States Patent
Misiak et al.

(10) Patent No.: US 7,968,326 B2
(45) Date of Patent: Jun. 28, 2011

(54) REMOVAL OF BY-PRODUCTS FROM CROSSLINKABLE PREPARATIONS

(75) Inventors: Hanns Misiak, Haan (DE); Michael Krebs, Hilden (DE); Timothy O'Connell, Düsseldorf (DE); Karl-Heinz Maurer, Erkrath (DE); Cornelia Kluin, Düsseldorf (DE); Inken Prüser, Düsseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/691,421

(22) Filed: Jan. 21, 2010

(65) Prior Publication Data

US 2010/0184121 A1    Jul. 22, 2010

Related U.S. Application Data

(63) Continuation of application No. PCT/EP2008/058119, filed on Jun. 26, 2008.

(30) Foreign Application Priority Data

Jul. 23, 2007   (DE) .......................... 10 2007 034 726

(51) Int. Cl.
    *B09B 3/00*    (2006.01)
(52) U.S. Cl. .................................... 435/262.5; 435/183
(58) Field of Classification Search ................. 435/262, 435/4, 183
    See application file for complete search history.

(56) References Cited

U.S. PATENT DOCUMENTS

| | | | | |
|---|---|---|---|---|
| 5,470,742 A | * | 11/1995 | Bull et al. | 435/262 |
| 2004/0209999 A1 | * | 10/2004 | Bohling et al. | 525/54.1 |
| 2008/0099400 A1 | * | 5/2008 | Nemser et al. | 210/638 |

* cited by examiner

*Primary Examiner* — Ralph Gitomer
(74) *Attorney, Agent, or Firm* — David P. LeCroy

(57) ABSTRACT

The present invention relates to the use of enzymes and/or whole-cell catalysts for the removal of undesired by-products from crosslinkable preparations.

13 Claims, 1 Drawing Sheet

REMOVAL OF BY-PRODUCTS FROM CROSSLINKABLE PREPARATIONS

CROSS-REFERENCE TO RELATED APPLICATIONS

The present application is a continuation of International Patent Application No. PCT/EP2008/058119, filed 26 Jun. 2008, which claims priority to German Patent Application No. 10 2007 034 726.1, filed 23 Jul. 2007.

The present invention relates to the use of enzymes and/or whole cell catalysts for removing undesired by-products from crosslinkable preparations.

Some crosslinking reactions give rise to undesired by-products. These generally comprise low molecular weight compounds released from the crosslinking components in the course of the crosslinking reaction. For instance, during curing of certain silicone sealant compositions bearing methoxy groups as the reactive group, methanol occurs as a by-product.

The object of the present invention is to enable removal of such by-products and, in particular, to reduce the release of such by-products into the surroundings.

It has surprisingly now been found that, by use of enzymes and microorganisms which produce these enzymes, release of the stated undesired by-products can be effectively suppressed. This was primarily surprising in that it was not expected that the enzymes and microorganisms in question can be obtained in the crosslinkable preparations in the active or native state in order to be able effectively to degrade the undesired by-products.

The present invention accordingly firstly provides the use of enzymes and/or microorganisms which produce these enzymes (hereinafter also referred to as "whole cell catalysts") for removing undesired by-products from crosslinkable preparations.

A crosslinkable (or crosslinking) preparation according to the invention refers to any desired preparation containing crosslinkable or crosslinking components. Regarding the degree of crosslinking, these may include preparations in which the crosslinking reaction has not yet begun, preparations in which the crosslinking reaction has already begun but is not yet complete, it being possible for the crosslinking reaction just to have started or already to be at an advanced stage, as well as preparations in which the crosslinking reaction is already largely or entirely complete.

The enzyme and/or the whole cell catalyst may not only be present in the crosslinkable preparation itself, but they may also be added to the crosslinkable preparation during the course of application thereof. Addition may occur not only shortly before application of the preparation, but also shortly after application of the preparation onto the application site, for instance, after application of a joint sealing composition into the joint, namely once the crosslinking process has already begun.

The present invention accordingly also further provides a crosslinkable preparation containing crosslinkable components, in particular crosslinkable monomers and at least one enzyme and/or at least one whole cell catalyst.

The present invention accordingly also further provides a multicomponent kit comprising a crosslinkable preparation and a preparation containing at least one enzyme and/or at least one whole cell catalyst.

The present invention further provides a method for removing undesired by-products from crosslinkable preparations, wherein a crosslinkable preparation which releases undesired by-products on crosslinking is brought into contact with an enzyme and/or a whole cell catalyst in order to remove the by-product, wherein the enzyme and/or the whole cell catalyst is either incorporated into the crosslinkable preparation and/or added thereto in the course of application, (i.e. before, during or after application). "Addition" should here be generally taken to mean bringing the crosslinkable preparation into contact with the enzyme and/or whole cell biocatalyst, (e.g., both mixing and surface application may occur).

Figure 1:
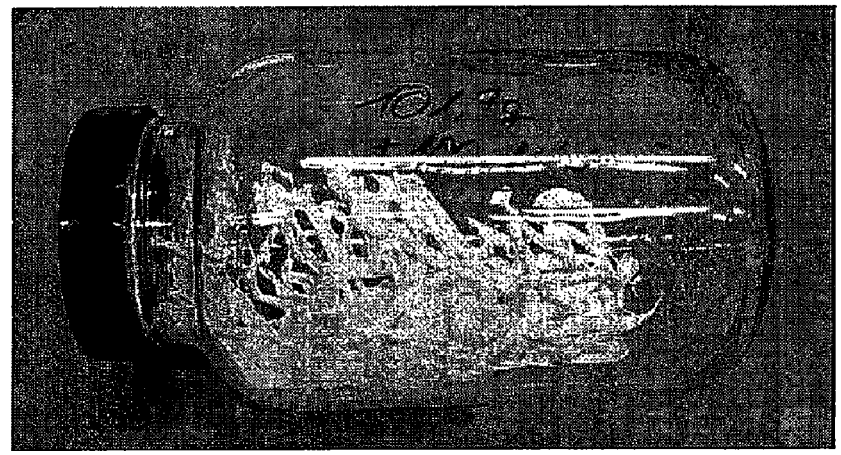
FIG. 1 is a photograph of a 1 L glass jar with joint sealing composition introduced therein. The quantity of methanol released from the methoxysilicone is determined by comparing an untreated joint sealing composition with joint sealing compositions treated by enzymes or whole cell catalysts.

In a preferred embodiment, application of the enzyme and/or whole cell catalyst occurs after application of the crosslinkable preparation onto the application site, in particular after application of a joint sealing composition into the joint. The enzyme and/or whole cell catalyst are preferably added in the form of a surfactant-containing preparation to the crosslinkable preparation applied onto the application site. The crosslinkable preparation, in particular, the joint sealing composition, may then simultaneously be smoothed, for example, by using a rubber glove. Application here preferably proceeds immediately after application of the crosslinkable preparation, such that crosslinking or physical setting has just begun and the by-product which arises can be degraded immediately after release. It is also possible, albeit less preferred according to the invention, to apply the enzyme and/or whole cell catalyst once crosslinking is complete, since released methanol may still be effectively removed in this case.

The present invention accordingly preferably provides a method for removing by-products, in particular, undesired by-products, from crosslinkable preparations, wherein a) a crosslinkable preparation is initially applied onto the application site, and b) thereafter a surfactant-containing preparation containing at least one enzyme and/or at least one whole cell biocatalyst is applied onto the crosslinkable preparation.

The crosslinkable preparation preferably includes a silane-curing preparation, in particular, a crosslinkable silicone composition or crosslinkable silyl group-containing prepolymers such as MS polymers, silanized acrylates, silanized polyolefins, in particular, silanized polyisobutene, or silanized polyurethanes or mixtures of these substances, wherein the silicone composition or preparation containing crosslinkable silyl group-containing prepolymers preferably comprises a sealing composition, in particular a joint sealing composition. The term "silanized" means in this connection that the compounds are those which crosslink by means of alkoxy, acetate, oxime, benzamide or aminosilane groups.

In a preferred embodiment, the undesired by-product includes an alcohol, preferably ethanol or methanol, an organic acid, in particular, acetic acid, an oxime, in particular, a ketoxime, a benzamide or an amine.

In a preferred embodiment, the enzyme used according to the invention and/or the enzyme produced by the whole cell catalyst used according to the invention is selected from alcohol-degrading, in particular, methanol-degrading enzymes, acetic acid-degrading enzymes, oxime-degrading, in particular, ketoxime-degrading enzymes, benzamide-degrading enzymes and amine-degrading enzymes.

The enzyme may generally be selected from enzymes which convert the corresponding by-product into another product. In addition to degradation, transformation into another organic substance is, for instance, accordingly conceivable.

Examples of useful methanol-degrading enzymes according to the invention include alcohol dehydrogenases (EC 1.1.1.1, 1.1.1.2 or 1.1.99.8), methanol dehydrogenase (EC 1.1.1.244), cyclohexanol dehydrogenase (EC 1.1.1.245), cholesterol oxidase (EC 1.1.3.6), alcohol oxidase (EC 1.1.3.13), formaldehyde dismutase (EC 1.2.99.4), catalase (EC 1.11.1.6), methanol 5-hydroxybenzimidazolylcobamide co-methyltransferase (EC 2.1.1.90), alcohol O-acetyltransferase (EC 2.3.1.84), sucrose phosphorylase (EC 2.4.1.7), levansucrase (EC 2.4.1.10), O-acetylhomoserine aminocarboxypropyltransferase (EC 2.5.1.49), alcohol sulfotransferase (EC 2.8.2.2), fatty-acyl-ethyl-ester synthase (EC 3.1.1.67), acid phosphatase (EC 3.1.3.2), phospholipase D (EC 3.1.4.4), venom exonuclease (EC 3.1.15.1), alpha-glucosidase (EC 3.2.1.20), beta-glucosidase (EC 3.2.1.21), alpha-galactosidase (EC 3.2.1:22), beta-mannosidase (EC 3.2.1.25), xylan 1,4-beta-xylosidase (EC 3.2.1.37), beta-N-acetylhexosaminidase (EC 3.2.1.52), L-iduronidase (EC 3.2.1.76), glucan 1,6-alpha-isomaltosidase (EC 3.2.1.94), glycopeptide alpha-N-acetylgalactosaminidase (EC 3.2.1.97), endoglycosylceramidase (EC 3.2.1.123), chymotrypsin (EC 3.4.21.1) and omega-amidase (EC 3.5.1.3).

Examples of useful acetic acid- or acetate-degrading enzymes according to the invention include hydroxymethylglutaryl-CoA reductase (NADPH) (EC 1.1.1.34), 3-keto-steroid reductase (EC 1.1.1.270), aldehyde ferredoxin oxidoreductase (EC 1.2.7.5), manganese peroxidase (EC 1.11.1.13), arsenate reductase (donor) (EC 1.20.99.1), selenate reductase (EC 1.97.1.9), phosphoribosylglycinamide formyltransferase (EC 2.1.2.2), cysteine synthase (EC 2.5.1.47), acetate kinase (EC 2.7.2.1), carbamate kinase (EC 2.7.2.2), formate kinase (EC 2.7.2.6), butyrate kinase (EC 2.7.2.7), propionate kinase (EC 2.7.2.15), propionate CoA-transferase (EC 2.8.3.1), acetate CoA-transferase (EC 2.8.3.8), butyrate-acetoacetate CoA-transferase (EC 2.8.3.9), glutaconate CoA-transferase (EC 2.8.3.12), 5-hydroxypentanoate CoA-transferase (EC 2.8.3.14), carboxylesterase (EC 3.1.1.1), arylesterase (EC 3.1.1.2), triacylglycerol lipase (EC 3.1.1.3), acetylesterase (EC 3.1.1.6), acetylcholinesterase (EC 3.1.1.7), cholinesterase (EC 3.1.1.8), tropinesterase (EC 3.1.1.10), pectinesterase (EC 3.1.1.11), sterol esterase (EC 3.1.1.13), retinyl-palmitate esterase (EC 3.1.1.21), dihydrocoumarin hydrolase (EC 3.1.1.35), lipoprotein lipase (EC 3.1.1.34), cephalosporin-C deacetylase (EC 3.1.1.41), alpha-amino-acid esterase (EC 3.1.1.43), 4-methyloxaloacetate esterase (EC 3.1.1.44), 1-alkyl-2-acetylglycerophosphocholine esterase (EC 3.1.1.47), wax-ester hydrolase (EC 3.1.1.50), 4-acetamidobutyryl-CoA deacetylase (EC 3.5.1.51), sialate O-acetylesterase (EC 3.1.1.53), acetoxybutynylbithiophene deacetylase (EC 3.1.1.54), acetylsalicylate deacetylase (EC 3.1.1.55), methylumbelliferyl-acetate deacetylase (EC 3.1.1.56), bis(2-ethylhexyl)phthalate esterase (EC 3.1.1.60), 5-(3,4-diacetoxybut-1-ynyl)-2,2'-bithiophene deacetylase (EC 3.1.1.66), acetylxylan esterase (EC 3.1.1.72), feruloyl esterase (EC 3.1.1.73), cutinase (EC 3.1.1.74), acetylajmaline esterase (EC 3.1.1.80), acetyl-CoA hydrolase (EC 3.1.2.1), palmitoyl-CoA hydrolase (EC 3.1.2.2), glutathione thiolesterase (EC 3.1.2.7), [citrate-(pro-3S)-lyase] thiolesterase (EC 3.1.2.16), ADP-dependent short-chain-acyl CoA hydrolase (EC 3.1.2.18), acyl-CoA hydrolase (EC 3.1.2.20), aryldialkylphosphatase (EC 3.1.8.1), amidase (EC 3.5.1.4), aryl-acylamidase (EC 3.5.1.13), N-acetylglucosamine-6-phosphate deacetylase (EC 3.5.1.25), chitin deacetylase (EC 3.5.1.41), N-acyl-D-amino-acid deacylase (EC 3.5.1.81), citrate (pro-3S) lyase (EC 4.1.3.6), citramalate lyase (EC 4.1.3.22), acetate-CoA ligase (EC 6.2.1.1), acetate-CoA ligase (ADP-forming) (EC 6.2.1.13), acetoacetate-CoA ligase (EC 6.2.1.16), propionate-CoA ligase (EC 6.2.1.17), [citrate-(pro-3S)-lyase] ligase (EC 6.2.1.22), benzoate-CoA ligase (EC 6.2.1.25) and phenylacetate-CoA ligase (EC 6.2.1.30).

Examples of useful oxime-degrading enzymes according to the invention include aldehyde oxidase (EC 1.2.3.1), pyridoxal 5'-phosphate synthase (EC 1.4.3.5), cytochrome-b5 reductase (EC 1.6.2.2), hydroxylamine reductase (NADH) (EC 1.7.1.10), 4-hydroxy-phenylacetaldehyde oxime monooxygenase (EC 1.14.13.68), camphor 5-monooxygenase (EC 1.14.15.1), isobutyraldoxime O-methyltransferase (EC 2.1.1.91), 3-hydroxymethylcephem carbamoyltransferase (EC 2.1.3.7), diacylglycerol O-acyltransferase (EC 2.3.1.20), long-chain-alcohol, O-fatty-acyltransferase (EC 2.3.1.75), oximinotransferase (EC 2.6.3.1), beta-lactamase (EC 3.5.2.6), aliphatic aldoxime dehydratase (EC 4.99.1.5), indoleacetaldoxime dehydratase (EC 4.99.1.6) and phenylacetaldoxime dehydratase (EC 4.99.1.7).

Examples of useful benzamide-degrading enzymes according to the invention include NAD(P)H dehydrogenase (quinone) (EC 1.6.5.2), flavin-containing monooxygenase (EC 1.14.13.8), polygalacturonate 4-alpha-galacturonosyltransferase (EC 2.4.1.43), amidase (EC 3.5.1.4), urethanase (EC 3.5.1.75), nitrilase (EC 3.5.5.1) and aliphatic nitrilase (EC 3.5.5.7).

Whole cell catalysts which naturally produce methanol-degrading enzymes and may be used include microorganisms chosen from *Acetobacter methanolicus, Acetobacter pasteurianus, Achromobacter methanolophila, Acidomonas methanolica, Aeropyrum pernix, Alteromonas* sp., *Alteromonas thalassomethanolica, Aminomonas aminovorus, Amycolatopsis methanolica, Ancylobacter* sp., *Bacillus methanolicus, Bacillus* sp., *Bacillus stearothermophilus, Basidiomycete* sp., *Butyribacterium methylotrophicum, Candida boidinii, Candida cariosilignicola, Candida glabrata, Candida methanolica, Candida methanosorbosa, Candida molischiana, Candida sonorensis, Candida* sp., *Candida succiphila, Clostridium thermosaccharolyticum, Desulfotomaculum solfataricum, Hansenula polymorpha, Hansenula polymorpha, Hyphomicrobium denitrificans, Hyphomicrobium* sp., *Lactobacillus brevis, Methanolobus tindarius, Methanomicrococcus blatticola, Methanomonas methylovora, Methanomonas methylovora* subsp. *thiaminophila, Methanosarcina mazei, Methanosphaera stadtmanae, Methylobacillus glycogenes, Methylobacillus methanolovorus* sp., *Methylobacterium aminovorans, Methylobacterium extorquens, Methylobacterium fujisawaense, Methylobacterium lusitanum, Methylobacterium mesophilicum, Methylobacterium organophilum, Methylobacterium radiotolerans, Methylobacterium rhodesianum, Methylobacterium rhodinum, Methylobacterium* sp., *Methylobacterium suomiense, Methylobacterium zatmanii, Methylococcus capsulatus, Methylocystis* sp., *Methylomicrobium album, Methylomonas clara, Methylomonas methanica, Methylomonas probus, Methylomonas* sp., *Methylophaga marina, Methylophaga thalassica, Methylophilus methylotrophus, Methylophilus* sp., *Methylosinus sporium, Methylosinus trichosporium, Methylovorus glucosotrophus, Microcyclus eburneus,*

*Moorella mulderi, Mycobacterium gastri, Mycobacterium smegmatis, Ogataea pini, Paracoccus alcaliphilus, Paracoccus denitrificans, Paracoccus* sp., *Peniophora gigantea, Phanerochaete chrysosporium, Pichia aganobii, Pichia angusta, Pichia cellobiosa, Pichia lindneri, Pichia methanolica, Pichia minuta* var. *minuta, Pichia pastoris, Pichia* sp., *Polyporus obtusus, Poria contigua, Protaminobacter candidus, Protaminobacter ruber* subsp. *machidanus, Protaminobacter thiaminophaga, Protaminobacter thiaminophagus, Pseudomonas aeruginosa, Pseudomonas fluorescens, Pseudomonas insueta, Pseudomonas methanolica, Pseudomonas polysaccharogenes, Pseudomonas putida, Pseudomonas* sp., *Pseudomonas viscogena, Radulum casearium, Rhodococcus ruber, Rhodococcus* sp., *Rhodopseudomonas acidophila, Saccharomyces cerevisiae, Schizosaccharomyces pombe, Sporothrix nivea, Stenotrophomonas maltophilia, Streptomyces hygroscopicus, Sulfolobus solfataricus, Thermoanaerobacter brockii, Thermoanaerobacter ethanolicus, Thermomicrobium roseum, Thermotoga lettingae, Torulopsis domercqii, Torulopsis enokii, Torulopsis glabrata, Torulopsis ingeniosa, Torulopsis methanolovescens, Torulopsis methanophiles, Torulopsis methanosorbosa, Torulopsis methanothermo, Torulopsis sonorensis, Trichoderma lignorum, Wickerhamiella domercqiae* and *Xanthobacter autotrophicus.*

An enzyme-containing preparation may be obtained by preparing a cell lysate of a microorganism which produces the desired enzyme, in particular, one of the above-stated microorganisms. The cell lysate is either used as such or, alternatively, the enzymes are further purified and/or concentrated based on this cell lysate.

Alternatively, the desired enzyme may also be expressed heterologously in other microorganisms, in particular bacteria. In this case, too, the cell lysate is then used or, alternatively, the enzyme is further purified and/or concentrated based on the cell lysate.

Some of the stated enzymes require further reactants for converting the by-product. These are stated, for example, in Tables 1 to 4. For instance, depending upon the selected enzyme, it may be necessary to add a further reactant selected from $NAD^+$, sucrose or cellobiose in order to convert methanol enzymatically, if the latter reactant is not already also present in the cell lysate and/or produced by the whole cell biocatalyst.

This further reactant is then preferably appropriately incorporated together with the enzyme and/or the whole cell catalyst into the crosslinkable preparation or applied together with the enzyme and/or the whole cell catalyst onto the crosslinkable preparation.

It is also possible according to the invention for the enzyme and/or whole cell catalyst to be incorporated into the crosslinkable preparation and the further reactant subsequently introduced into the crosslinkable preparation or applied onto the crosslinkable preparation. Conversely, it is likewise possible for the further reactant to be present in the crosslinkable preparation and for the enzyme and/or the whole cell catalyst to be subsequently introduced into the crosslinkable preparation or applied onto the crosslinkable preparation. It is moreover also possible for the enzyme and/or whole cell catalyst together with the further reactant to both be subsequently introduced into the crosslinkable preparation or applied onto the crosslinkable preparation; however, not in a single but instead in two temporally successive steps.

Some conversion reactions may give rise to a product which itself is also not particularly desired. Alcohol oxidase, for instance, catalyses the conversion of methanol and oxygen to yield formaldehyde and hydrogen peroxide. If an enzyme such as alcohol oxidase is used, further substances are then preferably used to scavenge or degrade these undesired derived products. This may involve chemical reagents, for example, amines in the case of formaldehyde, or alternatively, further enzymes and/or whole cell catalysts which degrade or transform these undesired products. It is also possible to use a whole cell catalyst which exhibits a plurality of enzyme activities, such that the transformation of methanol to formaldehyde and its further degradation is catalyzed by a single whole cell catalyst.

According to the invention, the enzymes and/or whole cell catalysts may be added in any form known in the prior art. These include solid preparations obtained by granulation, extrusion, spray drying or freeze-drying of the enzyme solution and/or cell dispersion together with further substances, preferably with polymers, or, in particular in agents in liquid or gel form, solutions of the enzymes, advantageously maximally concentrated, anhydrous and/or combined with stabilizers. Alternatively, both for the solid and for the liquid presentations, the enzymes and/or cells may be adsorbed onto a solid carrier and/or be encapsulated.

The encapsulated form may be considered in order to protect the enzymes and/or cells from other components or to enable controlled release. Depending on their size, these capsules are differentiated into milli-, micro- and nanocapsules.

Capsules which contain the enzyme and/or whole cell catalyst may be produced by initially mixing the enzyme and/or whole cell catalyst with a drop-forming matrix, such as sodium alginate, agarose or Sephadex, and optionally, a filler such as silica sand or siliceous earth. Spherical particles, which are usable as such according to the invention, are obtained by precipitating the resultant mixture, for example, in an ionic or thermal precipitation bath. Preferably, however, the resultant spherical particles are furthermore enclosed within an inert protective layer.

Encapsulation may alternatively also proceed by spray drying or extrusion of the enzyme solution or cell dispersion together with a preferably natural polymer or, for example, by embedding the enzyme or cells in a gel or in a core-shell type structure wherein the core is coated with a protective layer impermeable to water, air and/or chemicals. Further active ingredients, for example, stabilizers, emulsifiers, pigments or dyes, may optionally be applied in superposed layers. Such capsules can be produced according to per se known methods, for example, by agitated or rolling granulation or in fluidized bed processes. Advantageously, such granules are low-dusting, for example, due to the application of a polymeric film former, and stable in storage because of the coating.

The shell or protective layer of the capsules and/or the carrier may include natural, synthetic, semi-synthetic materials or mixtures thereof. Natural shell materials include saccharides or polysaccharides such as gum arabic, agar-agar, agarose, sucrose, maltodextrins, alginic acid and the salts thereof, in particular, sodium or calcium alginate, chitosan, starch, dextran or shellac, peptides, protein hydrolysates or polypeptides such as collagen, albumin or gelatin, fats, fatty acids, cetyl alcohol, lecithins or waxes. Semi-synthetic shell materials include chemically modified celluloses, in particular, cellulose esters and ethers, such as cellulose acetate, ethylcellulose, hydroxypropylcellulose, hydroxypropylmethylcellulose, carboxymethylcellulose or nitrocellulose derivatives, together with starch derivatives, in particular ethers and esters of amylose and amylopectin. Synthetic shell materials include polymers such as polyacrylates, polyamides, polyvinyl alcohol, polyvinyl acetate or polyvinylpyrrolidone. Compounds such as alginate-polylysine-alginate, nylon, silicone rubber, nylon polyethyleneimine, polylactic acid, polyglycolic acid, chitosan alginate, cellulose sulfate-poly(dimethyldiallyl)ammonium chloride, hydroxyethyl methacrylate-methyl methacrylate, chitosan-carboxymethylcellulose or hydrogels may also be used for producing the shell and/or be used as the carrier.

The shell may further include polyelectrolyte complexes. Polyelectrolyte complexes arise by interaction between polycations and polyanions. Useful polycations include not only natural materials such as chitosan, but also synthetic polymers such as polyethyleneimine, polydiethyldiallylammonium chloride, copolymers of diallylammonium salts and acrylamides, quaternized vinylpyrrolidone/vinylimidazole polymers, condensation products of polyglycols and polyamines, cationic silicone polymers such as amodimethicones, copolymers of adipic acid and dimethylaminohydroxypropyl diethylenetriamine, copolymers of acrylic acid and dimethyldiallylammonium chloride, polyaminopolyamides and the crosslinked water-soluble polymers thereof, condensation products prepared from dihaloalkylene, such as bis-dimethylamino-1,3-propane and quaternized ammonium salt polymers. Polyanions which may be used include water-soluble cellulose derivatives, in particular, carboxymethylcellulose or cellulose sulfate, pectins and alginates, carboxylated or succinylated chitosan derivative or synthetic polymers such as polyacrylic or polymethacrylic acids.

In one preferred embodiment, the enzyme and/or the whole cell catalyst is granulated together with a chemically inert carrier material and a chemically inert binder. The carrier material may be chosen from inorganic substances including clays, silicates or sulfates, in particular, talcum, silicas, metal oxides such as aluminum oxides and/or titanium dioxide, and silicates such as phyllosilicates, sodium-aluminum silicates, bentonites and/or aluminosilicates (zeolites). It may, however, also be an organic compound such as polyvinyl alcohol (PVA), in particular an at least partially hydrolyzed PVA.

Suitable binders in this embodiment include in particular uncrosslinked, polymeric compounds chosen from polyacrylates, polymethacrylates, methacrylic acid-ethyl acrylate copolymers, polyvinylpyrrolidones, polysaccharides or substituted polysaccharides, in particular cellulose ethers, and/or polyvinyl alcohols (PVA), preferably partially hydrolysed polyvinyl alcohols and/or ethoxylated polyvinyl alcohols and copolymers and mixtures thereof. Because of their adsorption properties simultaneously combined with a binding action, PVA or the derivatives thereof are thus suitable both as a carrier material and as a binder component. They may therefore be used as binders if they are not already used as a carrier material.

It is furthermore possible according to the invention to formulate two or more enzymes together such that a single granular product comprises two or more enzyme activities.

The shell is preferably selected so that the enzyme and/or whole cell catalyst are readily released on application.

Carriers based on metals, ceramics or limestone may, for example, moreover by used for immobilizing the enzyme and/or the whole cell catalyst.

Apart from encapsulation and immobilization, the enzyme and/or the whole cell catalyst may also be protected from damage such as inactivation, denaturation or decomposition due to physical influences, oxidation or proteolytic cleavage, during storage by the addition of stabilizing substances.

One group of suitable stabilizers according to the invention is reversible protease inhibitors. Benzamidine hydrochloride, borax, boric acids, boronic acids or the salts or esters thereof are frequently used for this purpose, especially those derivatives with aromatic groups, for example, ortho-, meta- or para-substituted phenylboronic acids, in particular, 4-formylphenylboronic acid, or the salts or esters of the stated compounds. Peptide aldehydes (i.e., oligopeptides with a reduced C terminus, in particular, those comprising 2 to 50 monomers) are also used for this purpose. Peptidic reversible protease inhibitors include inter alia ovomucoid and leupeptin. Specific, reversible peptide inhibitors for the protease subtilisin and fusion proteins of proteases and specific peptide inhibitors are also suitable for this purpose.

Further enzyme stabilizers include aminoalcohols such as mono-, di-, triethanol- and -propanolamine and mixtures thereof, aliphatic carboxylic acids up to $C_{12}$ such as succinic acid, other dicarboxylic acids or salts of the stated acids. End group-terminated fatty acid amide alkoxylates are also suitable for this purpose. Certain organic acids used as builders are additionally capable of stabilizing an enzyme which is present.

Lower aliphatic alcohols, especially polyols such as glycerol, ethylene glycol, propylene glycol or sorbitol, are further frequently used enzyme stabilizers. Diglycerol phosphate also provides protection from denaturation by physical influences. Calcium and/or magnesium salts are likewise used, such as calcium acetate or calcium formate.

Polyamide oligomers or polymeric compounds such as lignin, water-soluble vinyl copolymers or cellulose ethers, acrylic polymers and/or polyamides stabilize the enzyme preparation inter alia with regard to physical influences or fluctuations in pH. Polymers containing polyamine N-oxide simultaneously act as enzyme stabilizers and as dye transfer inhibitors. Other polymeric stabilizers include linear $C_8$-$C_{18}$ polyoxyalkylenes. Alkyl polyglycosides can also stabilize the enzymatic components of the agent according to the invention and are preferably additionally capable of enhancing their performance.

Reducing agents and antioxidants increase the stability of the enzymes towards oxidative decomposition; sulfur-containing reducing agents are, for example, typical for this purpose. Other examples include sodium sulfite and reducing sugars.

Particular preference is given to the use of combinations of stabilizers, for example, prepared from polyols, boric acid and/or borax, the combination of boric acid or borate, reducing salts and succinic acid or other dicarboxylic acids or the combination of boric acid or borate with polyols or polyamino compounds and with reducing salts. The action of peptide-aldehyde stabilizers is favorably increased by combination with boric acid and/or boric acid derivatives and polyols and still further by the additional action of divalent cations such as calcium ions.

If the enzyme and/or whole cell catalyst is incorporated into the polymerizable preparation, the enzyme and/or whole cell catalyst should be present in the dry state. If the enzyme and/or whole cell catalyst is not added until during application of the polymerizable preparation, the enzyme and/or whole cell catalyst may also be in liquid, gel or paste form.

Such liquid, gel or paste forms according to the invention may be produced by adding the enzymes and/or whole cell catalysts not only in the form of a concentrated aqueous or nonaqueous solution, suspension or emulsion obtained by protein isolation and preparation carried out in accordance with the prior art, but also in gel form or encapsulated or as a dried powder. Such preparations according to the invention are typically produced by simply mixing the ingredients, which may be introduced into an automatic mixer without solvent or as a solution.

Solvents which may be used in liquid, gel or paste preparations originate, for example, from the group of mono- or polyhydric alcohols, alkanolamines or glycol ethers, provided that they are water-miscible in the stated concentration range. The solvents are preferably chosen from ethanol, n- or i-propanol, butanols, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl, ethyl or propyl ether, dipropylene glycol monomethyl or monoethyl ether, diisopropylene glycol monomethyl or monoethyl ether, methoxy, ethoxy or butoxytriglycol, 1-butoxyethoxy-2-propanol, 3-methyl-3-methoxybutanol, propylene glycol t-butyl ether and mixtures of these solvents.

Liquid, gel or paste preparation may contain one or more thickeners or thickening systems for adjusting viscosity. These high molecular weight substances, also known as swelling agents, usually absorb liquids and in so doing swell up, turning into high-viscosity true or colloidal solutions. Suitable thickeners include inorganic or polymeric organic compounds. Inorganic thickeners include polysilicic acid and clay minerals such as montmorillonites, zeolites, silicas and bentonites. Organic thickeners may originate from natural polymers, modified natural polymers and completely synthetic polymers. Natural source polymers include agar-agar, carrageenan, tragacanth, gum arabic, alginates, pectins, polyoses, guar flour, locust bean flour, starch, dextrins, gelatin and casein. Modified natural thickeners include modified starches and celluloses. For example, these include carboxymethylcellulose and other cellulose ethers, hydroxyethyl- and -propylcellulose and seed flour ethers. Completely synthetic thickeners include polymers such as polyacrylic and polymethacrylic compounds, vinyl polymers, polycarboxylic acids, polyethers, polyimines, polyamides and polyurethanes.

Crosslinkable Preparations

Crosslinkable preparations according to the invention are preferably selected from adhesive, sealing and coating compositions, insulating materials, as well as sealants and adhesives. Particularly preferred sealing compositions include joint sealing compositions, silicone adhesives, carpet-laying adhesives and tile adhesives.

Sealing compositions and, in particular, joint sealing compositions typically contain organic polymers and in many cases mineral or organic fillers and other additives.

Suitable polymers include thermoplastic elastomers as described in DE-A-3602526, preferably polyurethanes and acrylates. Suitable polymers are also mentioned in published patent applications DE-A-3726547, DE-A-4029504 and DE-A-4009095, as well as in DE-A-19704553 and DE-A-4233077.

According to the invention, incorporation into the sealants may proceed both in the uncured state or in a state cured at below 60° C. For the purposes of the invention, sealants are materials conforming to DIN EN 26927, in particular, those which cure to yield plastic or resilient sealants. Sealants according to the invention may contain any additives typically found in corresponding sealing compositions, such as typical thickeners, reinforcing fillers, crosslinking agents, crosslinking catalysts, pigments, bonding agents or other volume extenders. Active ingredients used may be incorporated with exclusion of moisture and oxygen both into the finished sealing compositions and into parts thereof, or together with one or more components of the sealing compositions by dispersion in a manner known to a person skilled in the art, for example, by using dispersing apparatus, kneaders, planetary mixers, etc.

Even already cured, crosslinked sealing composition surfaces may be treated by application of solutions or suspensions of the enzymes and/or whole cell catalysts according to the invention, it being possible for the enzyme and/or whole cell catalyst to be transported into the sealing composition for instance also by swelling or diffusion.

Useful sealants according to the invention may be manufactured not only on a silicone or urethane basis, but also on an acrylic basis or, for example, on an MS polymer basis. Examples of urethane-based sealants are found in Ullmann's *Encyclopedia of Industrial Chemistry* ($8^{th}$ Ed., Chpt. 4 (2003)) and U.S. Pat. No. 4,417,042. Silicone sealants are known to a person skilled in the art, for example, from European Patent Application Nos. EP 0 118 030 A, EP 0 316 591 A, EP 0 327 847 A, and EP 0 553 143 A, German Patent Application No. DE 195 49 425 A, and U.S. Pat. No. 4,417,042. Examples of acrylic sealants are disclosed in, inter alia, WO 01/09249 or U.S. Pat. No. 5,077, 360. Examples of MS polymer-based sealants are disclosed, for example, in European Patent Application Nos. EP 0 824 574, EP 601 021 or EP 370 464, U.S. Pat. No. 3,971,751, U.S. Pat. No. 4,960,844, U.S. Pat. No. 3,979,344 or U.S. Pat. No. 3,632,557, and German Patent Application No. DE 4029504.

In one particularly preferred embodiment, the joint sealing composition is a silicone-based joint sealing composition, in particular, chosen from acetate, alkoxy, oxime, benzamide and amine silicones. As polyorganosiloxanes and organosilicone compounds with hydrolysable groups, the joint sealing composition here preferably contains compounds as are described in patent U.S. Pat. No. 5,378,406 in the quantities stated therein.

In particular, room temperature crosslinking systems such as are described in European Patent Application No. 0 327 847 or U.S. Pat. No. 5,077,360, are preferred. These may be single component or multicomponent systems, in which in the multicomponent systems the catalyst and crosslinking agent may be present separately (for example, disclosed in U.S. Pat. Nos. 4,891,400 and 5,502,144), or other "RTV two-component" silicone systems, in particular platinum-free systems.

"Single component" systems that contain all ingredients needed to form a sealing composition, are stored with exclusion of atmospheric humidity and/or atmospheric oxygen and, reacting with atmospheric humidity, and cure at the site of use, are particularly preferred. "Neutral" silicone systems may also be used, wherein the reaction of crosslinking agents with water in the ambient air does not give rise to corrosive, acidic, basic or strongly smelling cleavage products. Examples of such systems are disclosed in German Patent No. DE 195 49 425, U.S. Pat. No. 4,417,042 or European Patent No. EP 0 327 847.

Sealing compositions, and in particular, joint sealing compositions may contain aqueous or organic solvents. Organic solvents which may be considered include hydrocarbons such as cyclohexane, toluene or also xylene or petroleum ether. Further solvents include ketones such as methyl butyl ketone or chlorinated hydrocarbons.

Sealing compositions may also further contain rubber-like polymers. Relatively low molecular weight, conventional commercial grades of polyisobutylene, polyisoprene or polybutadiene-styrene may be considered here. Degraded natural rubber or neoprene rubber may also be co-used. Those grades which are still flowable at room temperature, often described as "liquid rubber", may also be used.

Sealing compositions according to the invention may be used for joining together or sealing a variety of materials. Application is primarily intended on concrete, glass, render and/or enamel and ceramics and porcelain. Joining or sealing of moldings or profiles of aluminum, steel or zinc, or also of plastics such as PVC or polyurethanes or acrylic resins is, however, also possible. Finally, sealing of wood or timber materials with other varieties of materials may be mentioned.

Stability of joint sealing compositions is typically achieved by adding finely divided solids, also known as fillers, which may be subdivided into those of the organic and inorganic kinds. Inorganic fillers include silica/silicon dioxide (coated or uncoated), chalk (coated or uncoated) and/or zeolites. The latter may additionally also act as desiccants. PVC powder may, for example, be considered as an organic filler. Fillers here generally substantially contribute to the sealing composition having a necessary internal cohesion after application, such that running or sagging of the sealing composition out of vertical joints is prevented. The stated additives or fillers may be divided into pigments and thixotroping fillers, which are also known as thixotroping agents.

Suitable thixotroping agents include known thixotroping agents such as bentones or kaolins, or also organic compounds such as hydrogenated castor oil or derivatives thereof with polyfunctional amines or the reaction products of stearic acid or ricinoleic acid with ethylenediamine. Co-use of silica, in particular, pyrogenic silica, has proved particularly favorable. Substantially swellable polymer powders may also be considered as thixotroping agents. Examples include polyacrylonitrile, polyurethane, polyvinyl chloride, polyacrylic acid esters, polyvinyl alcohols, polyvinyl acetates and their corresponding copolymers. Particularly good results may be achieved with finely divided polyvinyl chloride powders. Apart from the thixotroping agents, coupling agents such as mercaptoalkylsilane may also be used. It has been found convenient to use a monomercaptoalkyltrialkoxysilane. Mercaptopropyltrimethoxysilane is, for example, commercially conventional.

Properties of a joint sealing composition may be further improved if other components are also added to the plastics powder used as thixotroping agent. These include substances categorized as plasticizers or swelling agents and swelling auxiliaries used in plastics.

Plasticizers which may be considered include phthalic acid esters, particularly for urethane- or acrylic-based sealing compositions. Examples of usable compounds from this class of substances are dioctyl phthalate, dibutyl phthalate and benzylbutyl phthalate. Further suitable classes of substances include chlorinated paraffins, alkylsulfonic acid esters, for example, phenols or cresols, and fatty acid esters.

Plasticizers highly suitable for silicone sealant compositions include silicone oils, preferably polydimethylsiloxanes, and hydrocarbons and/or mixtures thereof, in particular, hydrocarbons or mixtures thereof with a boiling point greater than 200° C., in particular, greater than 230° C.

Usable swelling auxiliaries include low molecular weight organic substances miscible with the polymer powder and plasticizer. Such swelling auxiliaries can be found by a person skilled in the art in relevant plastics and polymer handbooks. Preferred swelling auxiliaries for polyvinyl chloride powder include esters, ketones, aliphatic hydrocarbons, aromatic hydrocarbons and aromatic hydrocarbons with alkyl substituents.

Pigments and dyes used include substances known for these intended applications, such as titanium dioxide, iron oxides and carbon black.

Storage stability can be improved by adding stabilizers such as benzoyl chloride, acetyl chloride, toluenesulfonic acid methyl ester, carbodiimides and/or polycarbodiimides to the sealing compositions. Olefins with 8 to 20 carbon atoms have proven to be particularly good stabilizers. In addition to their stabilizing action, these may also act as plasticizers or swelling agents. Preferred olefins are those with 8 to 18 carbon atoms, in particular, with the double bond arranged in 1,2-position. Particularly good results are obtained if the molecular structure of these stabilizers is linear.

The present invention also provides a method for determining the quantity of a volatile by-product released during crosslinking processes, comprising the following steps:
 a) arranging a solvent-containing dish on a larger dish which surrounds it,
 b) applying a crosslinkable preparation onto the peripheral free surface of the larger dish and then sealing the larger dish by applying an air-impermeable seal,
 c) optionally thoroughly mixing the solvent, preferably using a magnetic stir bar, and
 d) allowing the crosslinking reaction to complete, and analytically determining the content of the by-product present in the solvent.

The solvent here preferably comprises water, while the volatile by-product preferably comprises a water-soluble by-product, in particular, methanol.

EXAMPLES

Example 1

Measurement Method a) Method 1—Single Chamber System

Methanol released from a methoxysilicone sealing composition was investigated once curing was complete by rinsing out the air space of an air-tight sealed 50 ml to 1 L glass jar with water. Curing ran to completion over 12 to 48 hours. 10 to 100 ml of water were used for rinsing. The jar was stored on its side during curing (see FIG. 1). The product did not come into direct contact with water. After curing at room temperature and 1.5 hour at 4° C., the vessels were vigorously shaken for 10 minutes. Incubation at 4° C. brings about a lower saturation limit for methanol in the gas phase. The resultant solutions were then analyzed by GC and the methanol content quantified.

b) Method 2—Dual Chamber System

Figure 2:
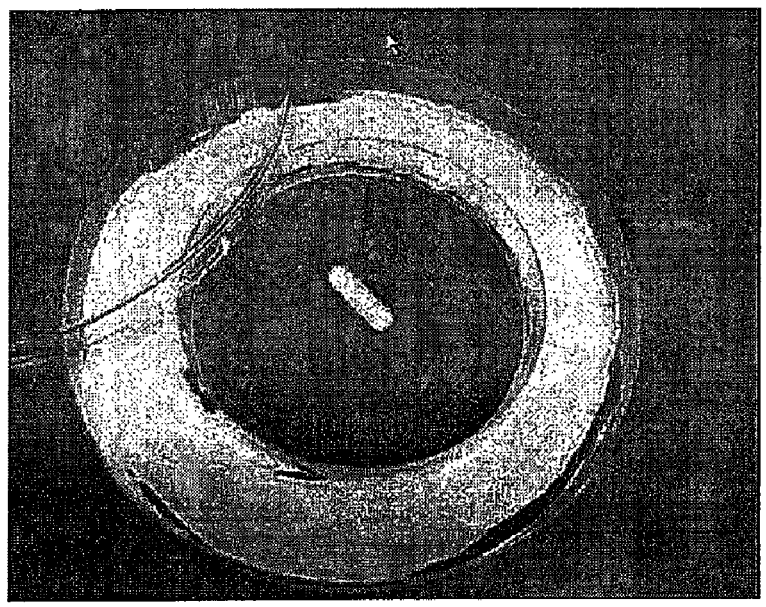
FIG. 2 is a photograph of a dual chamber system according to the invention. The inner chamber contains water which is stirred with a magnetic stir bar. The joint sealing composition is applied onto the bottom of the outer chamber and a solution or suspension containing enzyme or whole cell catalyst is then optionally applied, after which the content of methanol in the aqueous solution is determined.

Methanol released from a methoxysilicone sealing composition was investigated once curing was complete in an air-tight sealed dual chamber vessel (see FIG. 2). Curing ran to completion over 12 to 48 hours. 3 to 100 ml of water were used to absorb the methanol. The product did not come into direct contact with water. During curing at room temperature and for 1.5 hour at 4° C., the water was constantly mixed in order to absorb the methanol efficiently. The outer plastic dish contains the product, while the inner glass dish is filled with water. The water is stirred to enhance uptake of the released methanol. The external dish is sealed air-tight. Incubation at 4° C. brings about a lower saturation limit for methanol in the gas phase. The resultant solutions were then analyzed by GC and the methanol content quantified.

Example 2

Determination of Released Methanol using Single and Dual Chamber System

The quantity of methanol released was determined in both the single chamber system (Method 1) and dual chamber system (Method 2). It was found that the quantity of determinable released methanol may be better determined using the dual chamber system than the single chamber system. While 1.2 wt. % of methanol could be detected using the single chamber system, 1.6 wt. % of methanol could be detected with the dual chamber system (in each case, relative to total quantity of sealing composition used).

Example 3

Methanol Degradation by Alcohol Oxidase from *Candida boidinii*

A dual chamber system was used as described in Example 1. After application of the sealing composition, a powdered alcohol oxidase from *Candida boidinii* was uniformly spread on the applied sealing composition, and the quantity of methanol released was then determined as previously described. In this manner, the quantity of methanol released was reduced by 15%.

Example 4

Methanol Degradation by Crude Cell Extract from *Pichia*

A dual chamber system was used as described in Example 1. After application of the sealing composition, a crude cell extract from *Pichia* was uniformly spread on the applied sealing composition, and the quantity of methanol released was then determined as previously described. In this manner, the quantity of methanol released was reduced by more than 50%.

Example 5

Methanol Degradation by Mixture of α-glucosidase and D-cellobiose

A dual chamber system was used as described in Example 1. After application of the sealing composition, a mixture of α-glucosidase and D-cellobiose was uniformly spread on the applied sealing composition, and the quantity of methanol released was then determined as previously described. The addition of D-cellobiose is necessary here as α-glucosidase requires another substrate in addition to the methanol. In this manner, the quantity of methanol released was reduced by approximately 50%.

We claim:

1. Method of removing by-products from crosslinkable preparations comprising:
   applying onto an application site a crosslinkable silane-curing preparation which releases undesirable by-products upon crosslinking and is chosen from adhesives, sealing or coating compositions, or insulating materials, and
   contacting the crosslinkable preparation with at least one enzyme and/or whole cell catalysts able to remove the by-product,
   wherein the crosslinkable preparation is in a cured or uncured state.

2. Method according to claim 1, wherein the crosslinkable preparation is a silicone-, urethane-, acrylic- or MS polymer-based preparation.

3. Method according to claim 1, wherein the silane-curing preparation comprises acetate, alkoxy, oxime, benzamide and/or amine silicones.

4. Method according to claim 1, wherein the by-product is an alcohol, an organic acid, an oxime, a benzamide or an amine.

5. Method according to claim 1, wherein the by-product is a toxic, strongly smelling, corrosive, acidic or basic by-product.

6. Method according to claim 1, wherein the enzyme is an alcohol-degrading enzyme.

7. Method according to claim 6, wherein the alcohol-degrading enzyme is a methanol-degrading enzyme.

8. Method according to claim 7, wherein the methanol-degrading enzyme is chosen from alcohol dehydrogenases, methanol dehydrogenase, cyclohexanol dehydrogenase, cholesterol oxidase, alcohol oxidase, formaldehyde dismutase, catalase, methanol 5-hydroxybenzimidazolylcobamide co-methyltransferase, alcohol O-acetyltransferase, sucrose phosphorylase, levansucrase, O-acetylhomoserine aminocarboxypropyltransferase, alcohol sulfotransferase, fatty-acyl-ethyl-ester synthase, acid phosphatase, phospholipase D, venom exonuclease, β-glucosidase, α-galactosidase, β-mannosidase, xylan 1,4-β-xylosidase, β-N-acetylhexosaminidase, L-iduronidase, glucan 1,6-α-isomaltosidase, glycopeptide α-N-acetylgalactosaminidase, endoglycosylceramidase, chymotrypsin and omega-amidase.

9. Method according to claim 1, wherein the enzyme and/or whole cell catalyst is incorporated into the crosslinkable preparation.

10. Method according to claim 1, wherein the enzyme and/or whole cell catalyst is added to the crosslinkable preparation before, during or after application of the crosslinkable preparation.

11. Method according to claim 10, wherein the enzyme and/or the whole cell catalyst is applied in the form of a surfactant-containing preparation onto the crosslinkable preparation applied onto an application site.

12. Method according to claim 1, wherein the crosslinkable preparation is a sealing composition.

13. Method according to claim 12, wherein the sealing composition further comprises pigments and/or fillers.

* * * * *